No. 769,567. Patented September 6, 1904.

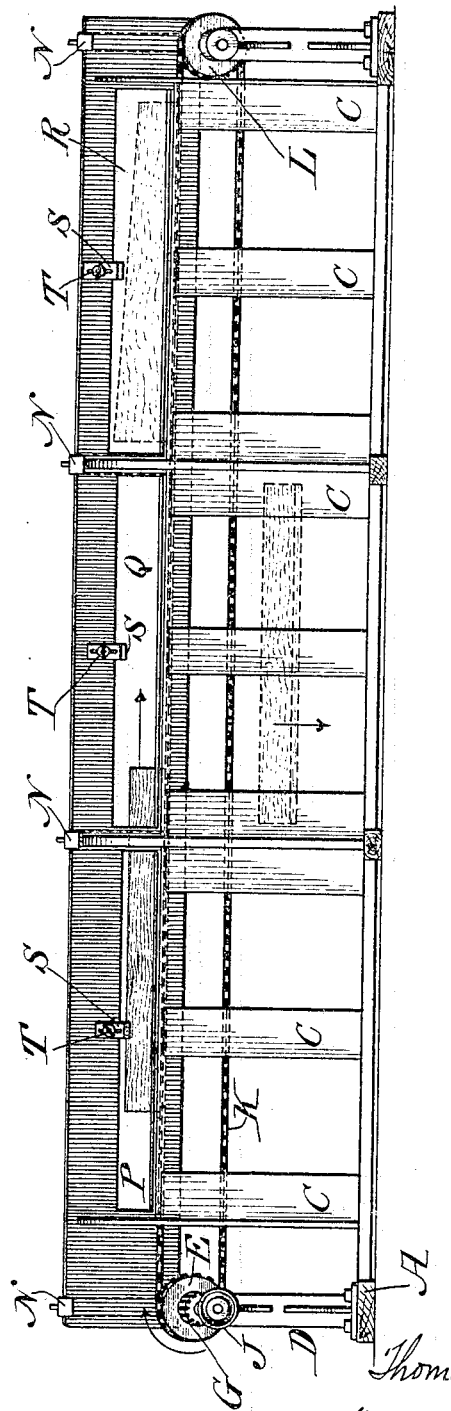

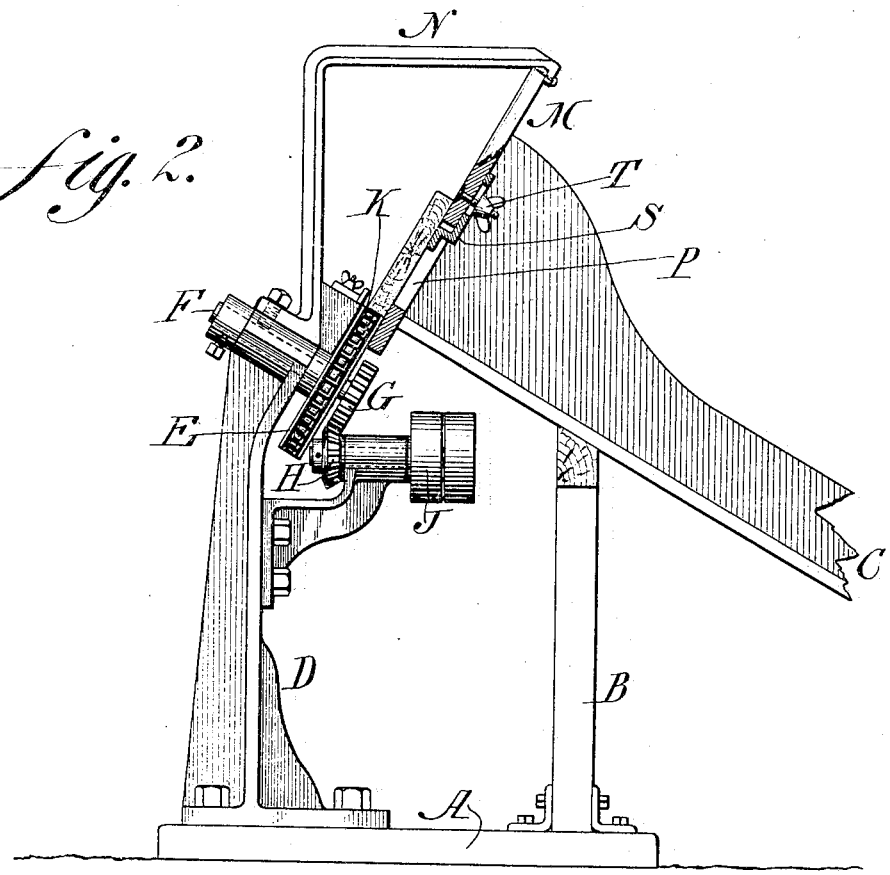
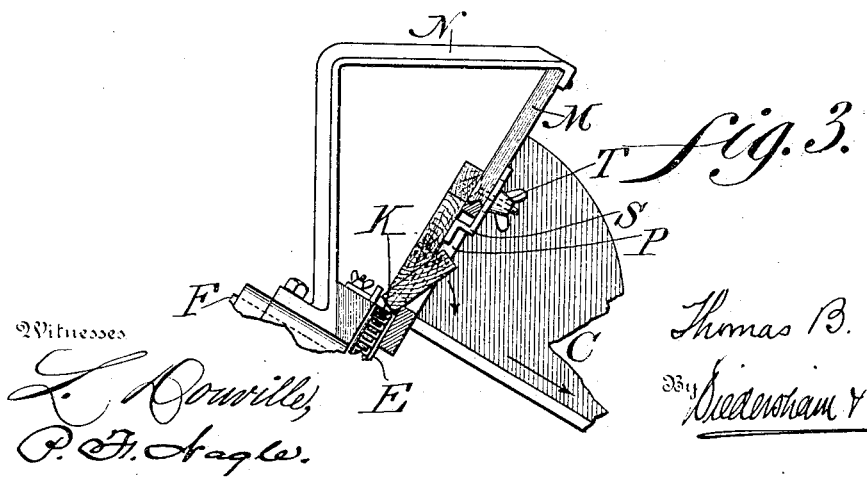

UNITED STATES PATENT OFFICE.

THOMAS B. RICE, JR., OF PHILADELPHIA, PENNSYLVANIA.

DEVICE FOR ASSORTING BOARDS OF DIFFERENT WIDTHS.

SPECIFICATION forming part of Letters Patent No. 769,567, dated September 6, 1904.

Application filed May 6, 1904. Serial No. 206,691. (No model.)

*To all whom it may concern:*

Be it known that I, THOMAS B. RICE, Jr., a citizen of the United States, residing in the city and county of Philadelphia, State of Pennsylvania, have invented a new and useful Improvement in Devices for Assorting Boards of Different Widths, of which the following is a specification.

My invention relates to an improvement in apparatus for sorting boards or other articles; and it consists of guides having openings through which the articles are directed.

It further consists in means for adjusting the openings.

It further consists of novel features of construction, all as will be hereinafter fully set forth.

Figure 1 represents a side elevation of the machine embodying my invention. Fig. 2 represents an end view thereof. Fig. 3 represents an end view of a portion of the device, showing a board in the act of passing through one of the openings.

Similar letters of reference indicate corresponding parts in the figures.

Referring to the drawings, A designates a base or support for the machine having standards B secured thereto, which in the present instance support the chute C.

D designates a suitable support secured to the base A, on which is suitably mounted a gear-wheel E, which is in the present instance held at an angle and is carried on a shaft F, to which motion is imparted in a suitable manner—for example, by the gear G, which meshes with the gear H, carried on a suitable shaft to which power is applied from any suitable source through pulleys J. K designates a chain apron or conveyer which passes around said gear E and also around a gear L, which is supported in any suitable manner at the opposite end of the machine from the gear E, it being seen that the chain K thus extends the entire length of the machine and traverses the same, it being understood, of course, that if necessary, suitable idlers or supports may be interposed at a suitable point in order to properly carry said chain.

M designates a guide, which is held at a suitable incline, as best shown in Figs. 2 and 3, and which is supported and held in position in any desired manner—for example, by arms N, which extend from a suitable part of the supporting-frame of the machine. In said guide I provide openings—P, Q, and R, for example—which are graded in size, the smallest being at the end of the machine at which the boards are adapted to enter and the largest at the opposite end. It will of course be understood, however, that the machine may be provided with any desired number of openings and may be graded accordingly. Secured to the guide M at a suitable point respecting the openings are fingers or lugs S and which are adjustable thereon—that is, can be raised and lowered and held in their adjusted position by means of a set-screw T, whereby the size of the openings may be adjusted.

The operation of the machine will be readily understood. Power is imparted by the pulleys J, which in turn imparts motion to the chain K. The boards are fed upon the chain from any desired point or place and enter the machine at the left. For example, the moving chain carries the same boards, and as the latter rest upon the guide M in their movement they will be presented successively to the openings therein, and when the board is of suitable width to pass between the lower wall of an opening in the guide and the lower portion of the lug S the same will fall through, owing to the inclination at which the boards are held, and will be carried off or directed to any suitable point or place. If, however, the board cannot pass through an opening— as, for example, the first, (seen in Fig. 1)— it will be carried by the chain until it comes to the next opening, through which it will fall if it is the right size, as seen in dotted lines in said Fig. 1. It will thus be understood that the boards will be properly sorted in an easy and convenient manner.

The machine can quickly be adjusted to accommodate various sizes. The first opening may be made for four-inch boards, the next to four and a half inches, and the next for five inches. In this way the four-inch boards will be directed through the first opening, and so on, while these sizes can be varied by adjusting the lugs. A further advantage of employing the lugs and having the same situated at a suitable point respecting the openings is that it prevents the boards from becoming wedged, which might otherwise occur where the edge of the board is not straight, as shown in dotted lines at the right of Fig. 1, the small end of which would have passed through the second opening, while the large end of the board could not.

It will be evident that various changes may be made by those skilled in the art which may come within the scope of my invention, and I do not therefore desire to be limited in every instance to the exact construction herein shown and described.

Having thus described my invention, what I claim as new, and desire to secure by Letters Patent, is—

1. In a device of the character described, a conveyer, supporting means having graded openings through which the board or other article is adapted to pass, and means for adjusting the size of said openings at a single point therein.

2. In a device of the character described, a conveyer, a guide suitably supported at an incline and having openings therein, means for adjusting the said openings, and means for locking said adjusting means in position.

3. In a device of the character described, a conveyer, a guide having openings therein, and a lug situated at substantially the center of the openings.

4. In a device of the character described, a conveyer, a guide having openings therein, lugs situated at a suitable point respecting said openings, and means for adjusting said lugs.

5. In a device of the character described, a conveyer, a guide held at an incline and having openings therein through which the board is adapted to pass, a lug at each opening, and means for directing the same to a suitable point.

THOMAS B. RICE, Jr.

Witnesses:
   T. L. BERRY,
   R. H. LUNT.